United States Patent [19]

Allard

[11] 4,437,258
[45] Mar. 20, 1984

[54] FISHING LEADER HOLDER

[76] Inventor: Gilbert Allard, 11 McLean, Alymer, Quebec, Canada, J9H 6A4

[21] Appl. No.: 338,735

[22] Filed: Jan. 11, 1982

[30] Foreign Application Priority Data

Nov. 18, 1981 [CA] Canada ................................. 390330

[51] Int. Cl.³ ............................................ A01K 97/00
[52] U.S. Cl. ...................................... 43/57.1; 43/57.2
[58] Field of Search .................... 43/57.1, 57.2, 44.98; 401/82, 176; 220/8

[56] References Cited

U.S. PATENT DOCUMENTS

| | | | |
|---|---|---|---|
| 742,040 | 10/1903 | Kurtz | 43/57.2 |
| 2,019,681 | 11/1935 | Kasdan et al. | 401/82 |
| 2,225,309 | 12/1940 | Lawrence | 43/57.2 |
| 3,771,882 | 11/1973 | Kapilow | 401/82 |

FOREIGN PATENT DOCUMENTS

611390  5/1926  France ................................. 401/82

*Primary Examiner*—Nicholas P. Godici
*Assistant Examiner*—Kurt Rowan

[57] ABSTRACT

The fishing leader holder of this invention consists of an outer cylindrical tube, an inner cylindrical tube rotatably mounted inside the outer tube, a longitudinal slot in each tube which can be mutually aligned, and a cylindrical inner securement part which can slide within the inner tube. The securement part has a radially extending projection which passes through the slots in the two tubes and, therefore, the securement part can slide longitudinally along the inner tube when the slots are mutually aligned. At one end of the slot in the outer tube, there is a short slot at right angles to the longitudinal slot so that when the securement part is at this one end of the slot, the inner tube can be rotated within the outer tube to both hold the securement part at one position and to cover the slot in the inner tube. A cap is fitted over the end of the inner tube which is adjacent to the short slot in the outer tube, and a resilient part is secured to the side of the cap facing the inside of the inner tube so that the securement part will be under the effect of the resilient part when its projection is within the short slot, so holding the securement part and the two tubes in their relative positions.

5 Claims, 3 Drawing Figures

FISHING LEADER HOLDER

BACKGROUND OF THE INVENTION

This invention relates to a holder within which fishing leaders can be held in an orderly and protected fashion, and can be readily removed from the holder when required.

When fishing with flies or lures, it is normal for the fishermen to carry, as well as a supply of flies and lures, a number of leaders which can be of different lengths and of different weights to suit the type of fly or lure being used. In order to carry the leaders without them becoming entangled and knotted, there are various known items for storing the leaders, these consisting of tube holders of various types within which the leaders are stretched between springs. Such holders, while being adequate for holding the lures in a manner which prevents tangling of them, are, however, awkward to manipulate due to the tension created by the springs. This problem is more pronounced due to the fact that the fisherman's hands will be wet and the leader will be slippery to hold and, furthermore, even on a warm day, the wet hands will be cold and manipulation of a leader, which is in a holder having leader holding springs, is difficult.

There is, therefore, a need for a fishing leader holder which is both easy to use, even under adverse climatic conditions, and yet is capable of storing leaders in an unravelled and neat condition.

SUMMARY OF THE INVENTION

In order to achieve this, the fishing leader holder of this invention consists of an outer cylindrical tube, an inner cylindrical tube rotatably mounted inside the outer tube, a longitudinal slot in each tube which can be mutually aligned, and a cylindrical inner securement part which can slide within the inner tube. The securement part has a radially extending projection which passes through the slots in the two tubes and, therefore, the securement part can slide longitudinally along the inner tube when the slots are mutually aligned. At one end of the slot in the outer tube, there is a short slot at right angles to the longitudinal slot so that when the securement part is at this one end of the slot, the inner tube can be rotated within the outer tube to both hold the securement part at one position and to cover the slot in the inner tube. A cap is fitted over the end of the inner tube which is adjacent to the short slot in the outer tube, and a resilient part is secured to the side of the cap facing the inside of the inner tube so that the securement part will be under the effect of the resilient part when its projection is within the short slot, so holding the securement part and the two tubes in their relative positions.

DETAILED DESCRIPTION OF PREFERRED EMBODIMENTS

Figure 1:
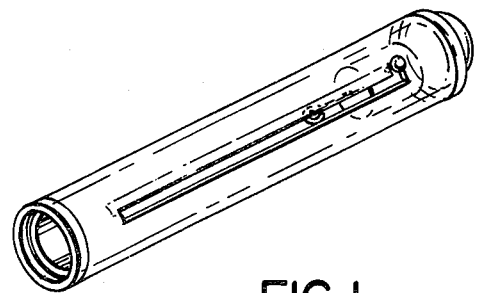
FIG. 1 is a perspective view of the holder in closed position.
Figure 2:
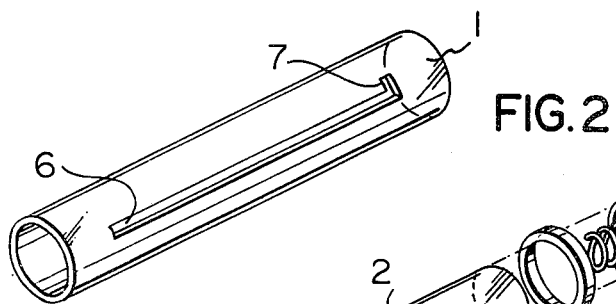
FIG. 2 is a perspective view of the outer tube of the holder of FIG. 1.
Figure 3:
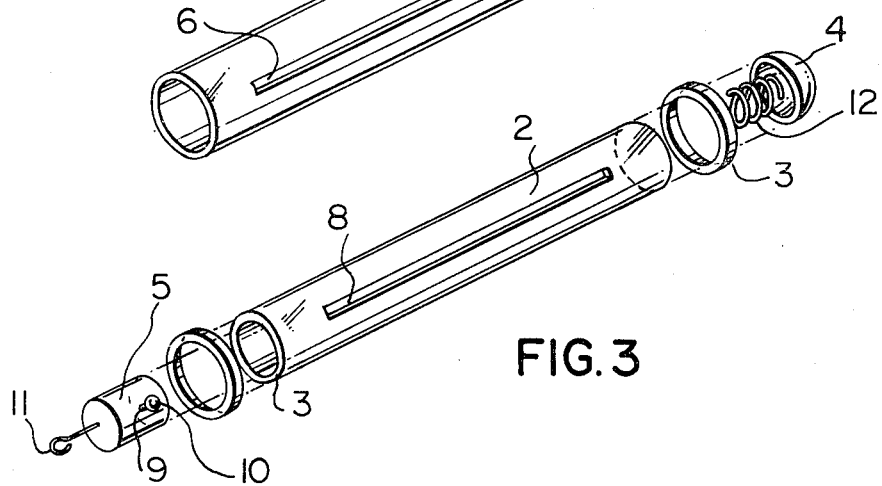
FIG. 3 is a exploded perspective view of the inner tube and the remainder of the parts of the holder of FIG. 1.

Referring specifically to the drawings, the holder consists of an outer tube 1; an inner tube 2, which is rotatably mounted within outer tube 1 and held in position within outer tube 1 by collars 3; a cap 4 secured to one end of the inner tube 2; and a securement part 5, which can slide within the inner tube 2.

The outer tube 1 is of an open ended cylindrical form and has a slot extending along most of its length. The slot 6 has a short transverse slot 7 at one end thereof.

The inner tube is of an open ended cylindrical form and has a slot 8 extending along most of its length, this slot 8 being approximately of the same length and dimensions as the slot 6. The inner tube 2 is slightly longer than the outer tube 1 so that when the inner tube 2 is placed within the outer tube 1, it extends from each end of the outer tube 1 and the collars 3 can then be slid over the extending ends of the inner tube 2 and secured in place so that the inner tube 2 will be rotatable within the outer tube 1, but not longitudinally displaceable. The collars 3 can be secured to the extending ends of inner tube 2 by any known means such as by adhesive.

The securement part 5 has a projection 9 extending normal to the securement part, the projection 9 having an enlarged head 10 at its outer end. Thus, after the securement part 5, minus the projection 10, is placed within the inner tube 2, which itself is positioned within the outer tube 1, the slots 6 and 8 are aligned and the projection 9 is placed through the aligned slots and fitted into the securement part 5. The projecton 9 can be conveniently screwed into the securement part 5 or alternatively can be adhesively held therein. An eyelet 11 extends from one end of the securement part 5, this being for holding the leaders. Cap 4 has a resilient part 12, which can be in the form of a coil spring as shown, although, it could be a small block of rubber or other resilient material, secured to the side which faces within the inner tube 2. This securement, again, can either be mechanical as shown, or through adhesive. The cap 4 is secured to the end of the inner tube 2 which is the closest to the short slot 7 when the holder is assembled.

The holder is shown in the drawings as being made almost completely from a clear plastic, such as that known by the trade mark PERSPEX, and can readily be assembled by use of close fitting to lorances between the parts and adhesive, however, any other type of suitable material, such as metal could be utilized.

It can thus be seen that when leaders are secured to the eyelet 11, they can be withdrawn into the inner tube 2 by moving the securement part 5 by the enlarged head 10. When the projection 9 reaches the other end of the aligned slots 6 and 8, the projection 9 can be moved along short slot 7 after securement part 5 has been moved against the resiliency of resilient part 12, so rotating inner tube 2 with respect to outer tube 1 and covering the slot 8 with part of the surface of outer tube 1. The holder will effectively be held in this closed position by resilient part 12. In order to obtain a leader from the holder or insert another leader into the holder, it is then merely necessary to move projection 9 along slot 7 by means of the enlarged head 10, so rotating the inner tube 2 with respect to the outer tube 1, and aligning slots 6 and 8. The securement part can then be slid along the inner tube 2 by the enlarged head 10 so exposing the eyelet 11, so that a leader can be removed or added.

It is thus seen that the fishing leader holder as described is economical to manufacture, easy to operate and extremely useful for holding fishing leaders.

I claim:

1. A fishing leader holder consisting of:

an outer cylindrical tube, an inner cylindrical tube rotatable within the outer tube, and a cylindrical securement part slidable within the inner tube, the inner and outer tubes having mutually alignable slots along their lengths, and the securement part having a radially disposed projection passing through both of the slots and means on the securement part for releasably securing fishing leaders such that when the securement part is slid into the inner tube the fishing leaders are retracted into the inner tube.

2. The holder of claim 1, wherein the slots are longitudinal.

3. The holder of claim 1, including a short transverse slot near an end of the outer tube such that when the securement part is slid into the inner tube the projection enters the transverse slot so that when the inner tube is rotated relative to the outer tube, the projection is slid along the transverse slot so holding the securement part within the inner tube and also closing access through the longitudinal slots of the fishing leaders.

4. The holder of claim 1, including a cap on one end of the inner tube and a resilient part within the cap.

5. The holder of claim 1, wherein the inner tube is longer than the outer tube, and collars secured to each end of the inner tube hold it in a position which permits relative rotation between the inner and outer tubes.

* * * * *